Figure 1:
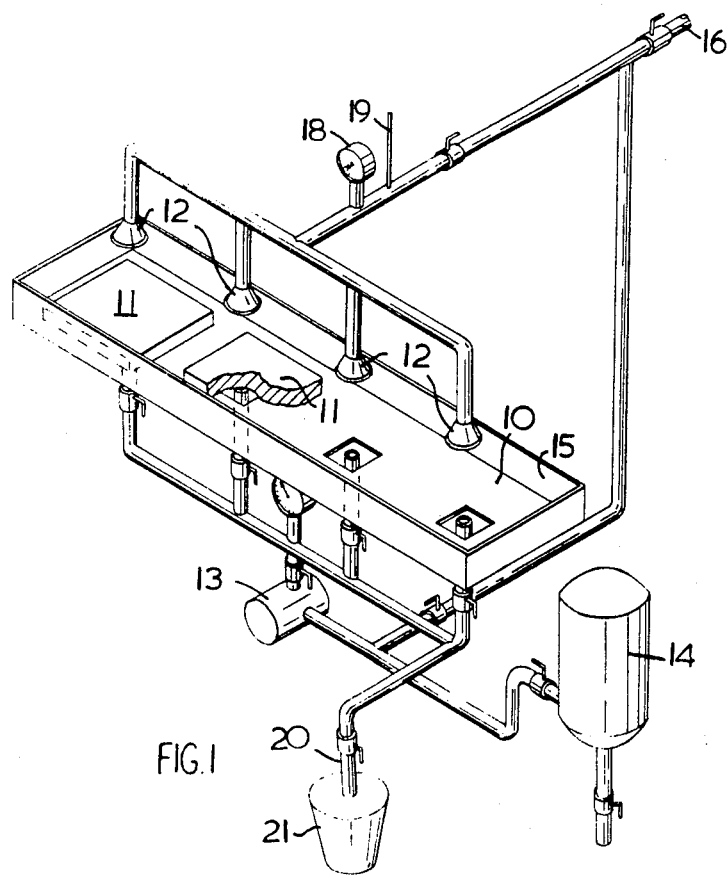

United States Patent [19]

Rao

[11] 3,855,393

[45] Dec. 17, 1974

[54] PROCESS FOR PRODUCING LOW THERMAL CONDUCTIVITY HIGH STRENGTH SILICA FOAM

[75] Inventor: Ramesh P. Rao, San Antonio, Tex.

[73] Assignee: Fiberglas Canada Limited, Ontario, Canada

[22] Filed: Dec. 9, 1971

[21] Appl. No.: 206,438

[52] U.S. Cl.............. 423/339, 106/75, 423/185, 423/335
[51] Int. Cl............................................ C01b 33/12
[58] Field of Search .......... 423/325, 326, 335, 338, 423/339, 332, 333, 463, 464, 467, 499, 185; 106/69, 74, 75, 86; 252/62; 264/41, 42

[56] References Cited
UNITED STATES PATENTS

| | | | |
|---|---|---|---|
| 2,768,063 | 10/1956 | Domicone | 423/339 |
| 3,136,645 | 6/1964 | Dess | 106/75 |
| 3,411,879 | 11/1968 | Holmes et al. | 423/488 |
| 3,563,699 | 2/1971 | Cuneo et al. | 423/339 |
| 3,573,228 | 3/1971 | Hulmes et al. | 423/326 |
| 3,741,898 | 6/1973 | Mallow et al. | 106/75 |

Primary Examiner—Oscar R. Vertiz
Assistant Examiner—Gary P. Straub
Attorney, Agent, or Firm—Stevens, Davis, Miller & Mosher

[57] ABSTRACT

This specification discloses an improvement in the manufacture of silica foam involving the use of a fluoride type insolubilizer. This invention introduces the additional step of removing the fluoride reaction product from the cured foam by the use of a leaching agent having the ability to form water soluble or water dispersible fluoride compounds or complexes which exhibit a reduced affinity for the silica foam structure. The resulting product is a low thermal conductivity, high strength, non-toxic and incombustible silica foam.

4 Claims, 2 Drawing Figures

PROCESS FOR PRODUCING LOW THERMAL CONDUCTIVITY HIGH STRENGTH SILICA FOAM

Heat insulating inorganic foams can be prepared in accordance with the processes set out in U.S. application Ser. No. 102,504 of Mallow et al, entitled "Solidified Silica Foam Product & Process" and filed on Dec. 29, 1970, and now abandoned; and in the continuation-in-part application thereof filed Nov. 12, 1971, Ser. No. 198,279.

The field of art to which the product invention pertains is the manufacture of a solidified silica foam product from sodium silicate or potassium silicate or mixtures thereof and having a rigid structure comprising a network of silica. An important use of the product is as a structural and insulation material. Its resistance to high temperature and moisture, together with its low thermal conductivity and excellent mechanical strength, makes it especially suited to such use.

The process is carried on in one aspect by reacting an aqueous alkali metal silicate with stoichiometric quantity of sodium silicofluoride or other alkali metal silicofluoride as an insolubilizer in the presence of a saponifying agent. The rigidization of the cellular structure is accomplished by a reaction of the alkali metal silicofluoride with the alkali metal silicate resulting in the formation of silica and stoichiometric quantities of alkali metal fluoride. This can be represented as follows, where M is alkali metal such as Na, K, or Rb:

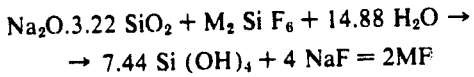

$$Na_2O \cdot 3.22\ SiO_2 + M_2SiF_6 + 14.88\ H_2O \rightarrow$$

$$\rightarrow 7.44\ Si(OH)_4 + 4\ NaF = 2MF$$

unless M = Na
in which case the right side of the equation reads:

$$\rightarrow 7.44\ Si(OH)_4 + 6\ NaF$$

When this reaction is completed, the product will contain almost 37 percent sodium fluoride when M is sodium. Sodium fluoride is soluble, has a high thermal conductivity and is very toxic. Sodium fluoride has approximately 40 times the thermal conductivity of silica.

The open cell foam when formed and still very wet, consists of a much modified collection of bubbles. As the water leaves the foam by drainage and otherwise, the foam becomes a network of open cells. The sodium fluoride is dispersed in the water and on the walls of the cells. The sodium fluoride must be removed before the removal of water has progressed very far, since sodium fluoride crystal growth tends to degrade and weaken the silica cell structure. When present in silica foam it acts as a flux, reducing the thermal stability of the foam. The presence of water soluble sodium fluoride in the foam would tend to cause efflorescence to the surface, causing a breakdown of the cellular structure, and formation of a white surface film.

It is an object of the present invention to provide a process for the production of fluoride-free silica foam having thermal stability in excess of 2,000, and up to 2,500°F, and thermal conductivity as low as 0.25 BTU in/hr/ft²/°F. at 75° F. mean temperature. An added object of this invention is to remove the highly conductive alkali metal fluoride such as sodium fluoride from silica foam prepared by the above process.

It is a further object of the present invention to provide such a process wherein the fluoride is removed from the foam in a readily useable form. When sodium silicofluoride is used as the insolubilizing agent, cryolite may be obtained as a byproduct of the sodium fluoride extraction step.

These objectives can be achieved by leaching the rigid silica foam sodium fluoride composite with an aqueous solution of an extracting agent. The leaching can be carried out at ambient or elevated temperature. The reagent is chosen so as to form complexes or stable compounds with the fluoride present in the foam. Commercially valuable byproducts can be recovered by conventional means, such as precipitation, crystallization, evaporation, etc., followed by gravitational or mechanical separation. If desired, the resulting foam can then be washed with water and dried to obtain the product.

Figure 2:
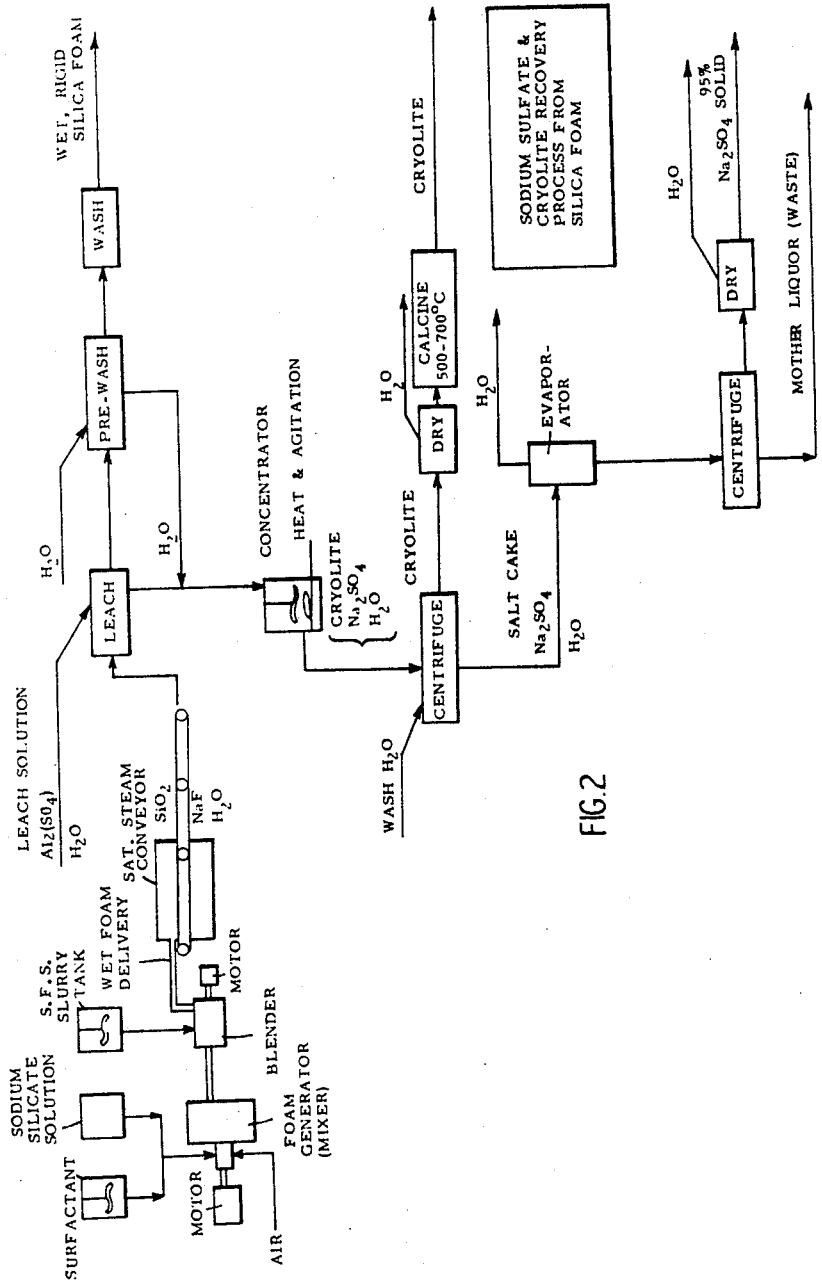

In the drawings which accompany this application,

FIG. 1 is a perspective view of a leaching apparatus employing a leaching agent, spray, and suction means, and FIG. 2 is a flow sheet showing a typical total process for the production and treatment of pure silica foam and the recovery of commercially valuable cryolite (sodium aluminum fluoride) and sodium sulfate.

The present invention therefore provides a method for the manufacture of low density inorganic silica form, comprising the steps of:

a. foaming an aqueous alkali metal silicate, b. curing the resulting foam in the presence of a fluoride-containing insolubilizing agent, the resulting cured foam product having a rigid structure consisting essentially of a silica network.

c. leaching the cured foam with an aqueous solution or colloidal aqueous suspension of a salt, acid or base leaching agent, said leaching agent being non-reactive with respect to the silica foam structure, said leaching agent having the ability to form water soluble or water dispersible fluoride compounds or complexes having reduced affinity for the silica foam structure.

In a further aspect, the present invention provides, in a process for the preparation of inorganic silica foam wherein an aqueous alkali metal silicate is foamed, and said foam is cured in the presence of an alkali metal or alkaline earth, metal silicofluoride insolubilizer, resulting in a rigid foamed structure having cell walls formed of silica, and interstitial metal fluoride reaction product, the improvement comprising: removing said metal fluoride by leaching the cured foam with an aqueous solution or colloidal aqueous suspension of a salt, acid or base leaching agent, said leaching agent being non-reactive with respect to silicic acid, said leaching agent having the ability to form water soluble or water dispersible fluoride compounds or complexes having reduced affinity for the silicic acid structure.

The aqueous leaching agent will be a salt, acid or base to which sodium fluoride has a stronger affinity than to silica. It should be non-reactive with respect to silica.

Water alone seems to be very ineffective in dislodging the sodium fluoride from its mooring in the foam matrix. It appears that water is not capable of efficiently overcoming the electrostatic or covalent bond between the sodium fluoride and the silanol groups and silica groups in the silica cell structure. Acids, acid salts and many neutral and alkaline materials, such as urea, ammonium hydroxide, are effective in complexing or solvating sodium fluoride. When the sodium fluoride is found in silica form, its removal does not appear to be directly related to its solubility in the leaching media, but to the capability of the leaching agent to overcome the bonding or attraction force of the silica to sodium fluoride. It has been suggested that the fluoride is attached in a quasi-covalent bond to the silanol group and that the bond is weakened or severed by a strong electrophile, particularly hydronium ion $H_3O+$ or $H+$. eg:

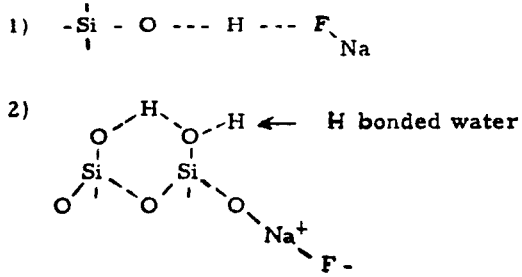

However, leaching with strong acids has been found to adversely effect the ultimate strength and integrity of the silica foam.

The acid salts of ammonia have been studied and have been found to be very effective in removing sodium fluoride from silica foam. The resulting foam does not appear weakened by the ammonium salts. Ammonium chloride and ammonium sulfate were comparatively tested, and the sulfate was selected on the basis of the common anion with the aluminum sulfate which is subsequently introduced in the recovery process. Cryolite was quantitatively recovered at room temperature by the addition of aluminum sulfate to ammonium sulfate/NaF leachate solution in stoichiometric amount.

Ammonium sulfate solution at a 25-pph concentration (20 percent solution) and at 118° F. was found to be very effective, and rapidly abstracted the fluoride from even a very high-density foam. A given fluoride ion concentration is found to gradually drop in the presence of many acids and acid salts. The first fluoride ion measurement was made after 8 minutes and indicated 6,800 ppm; the next was 6,500 ppm after 10 minutes and, finally, 4,200 ppm after 45 minutes of leaching.

A controlled parallel study involving only ammonium sulfate and sodium fluoride (without foam) was found to give similar trends as shown in Table 1.

Table 1

| Time | (F) | pH |
|---|---|---|
| 0 | 4800 ppm | 7.9–8.0 |
| (added amm. Sulfate — solids at 20 pph to the solution) | | |
| + 30 sec. | 5200 ppm | 7.5 |
| 1 min | 4600 ppm | 6.5 |
| 5 min. | 4000 ppm | 6.4 |
| 10 min | 3500 ppm | 6.3 |
| 15 min | 3000 ppm | 6.3 |
| 30 min | 2600 ppm | 6.3 |

From the above, it appears that sodium fluoride is being complexed in some manner by the ammonium sulfate, when the two are codissolved in measured proportions.

Among the leaching agents which have been found useful in aqueous solutions or colloidal suspensions, are salts, bases and acids derived from the following group of cations and anions.

cations: ammonium, aluminum, zinc, magnesium, calcium, zirconium, titanium, molybdenum, iron, lithium and barium.

anions: hydroxides, peroxides, carbonates, bicarbonates, chlorides, nitrates, nitrites, oxychlorides, borates, metaborates, orthoborates, bisulfates, sulfates, bisulfites, sulfites, phosphates, zincates, stannates, aluminates, chromates, dichromates, titanates, zirconates, manganates, molybdates, acetates, and formates.

Preferred leaching agents include ammonium sulfate, aluminum sulfate, calcium chloride, aluminum chloride, boric acid and hydrochloric acid, in aqueous solution. The concentration of the leaching solution or suspension may be varied, so as to optimize the rate of leaching and other process considerations. As a matter of convenience, it will normally lie in the range of 5 to 45 percent.

It is found that water soluble or water dispersible complexes are formed, which drain out of the foam. This is true even in the case of such materials as calcium chloride and aluminum chloride, which could have been expected to react with the sodium fluoride to form insoluble calcium fluoride or sodium aluminum fluoride in the foam.

FIG. 1 illustrates a lab, scale apparatus for the extraction of square foam slabs measuring approximately 8 inches × 8 inches and 2 inches thick. A rubber gasket 10 having an inner opening somewhat smaller than the dimension of the foam slab 11 assists in maintaining a negative pressure at the bottom face of the foam slab. A typical leaching process involves the application of the leaching solution through the spray nozzles 12 to the surfaces of foam slabs while a pump 13 is employed to pull a suction on the opposite surface as well as to recirculate the leachate back through the spray nozzles. The leachate can be recirculated for the desired period of time, and then returned to a storage reservoir and recovery tank 14. The leaching tank 15 is also connected to a water supply line 16 so that leaching cycle can be followed by a spray-suction washing cycle. A 0–30 inch of mercury vacuum gauge 17 is in line with the pump 13 used for circulating the leachates, as is pressure gauge 18. A thermometer 19 measures leachate or rinse water temperature. A waste line 20 and waste receiver 21 is also provided. The temperature maintained during leaching is generally in the range from 10° C. up to the boiling point of the solution, preferably above about 40°C. The leaching or extraction is normally carried out for a period from about 3 minutes to about 10 minutes, and normally will be terminated only when substantially all of the fluoride has been removed. This can be determined by the use of a specific fluoride ion electrode, by standard analytical methods. Longer periods are used where lower leaching temperatures are employed and in those instances where dilute solutions of the leaching agent are circulated.

FIG. 2 shows an overall process for the mixing, foaming, curing, leaching and washing of a silica foam material. This flow sheet in FIG. 2 also shows the disposition of the leachate and its treatment for the removal of the cryolite and sodium sulfate as useful byproducts.

Depending on the leaching agent employed, the fluoride is recovered directly as a precipitate or as a soluble fluoride complex of the leaching agent, which is further treated to obtain, for example, a precipitate of sodium aluminum fluoride (cryolite) or aluminum fluoride. The slurry containing the precipitate is passed from the reservoir to a settling tank and retained for a period of from 5 to 60 minutes, where the fluoride precipitate is caused to settle in the tank while the clarified liquor consisting of substantially defluorinated leachate is drawn off for subsequent use. The volume and cross-sectional area of the settling tank are selected to be sufficient to achieve a separation of the fluoride precipitate at the settling velocity over the desired period of time.

The settled mud may be passed to a wet classifier where it can be treated with an aqueous liquor as a wash. Wet classification is generally defined as the separating of solid particles in a mixture of solids, such as the settled mud, into fractions according to the particle size or density by methods other than screening.

Any conventional leaching techniques may be used. For example, counter-current leaching techniques may be useful in avoiding the use of excessively large quantities of leaching agent.

In the practice of this invention, any suitable extracting reagents such as those mentioned earlier, or a combination of these, may be employed. The clarification, classification and leaching and recovery operations set forth here may be carried out in any convenient equipment, the details of which are not the essential feature of the invention. Thus, any suitable leaching device, settling chamber or seeding agent may be employed in the defluorination of the silica foam. Likewise, a centrifuge, hydrocyclone or other suitable classification vessel can be employed in place of the systems discussed above.

In the production of the silica foam, the fluoride produced may be other than sodium fluoride or a mixture of sodium and other alkali metal fluorides. The process described in this disclosure is equally applicable to all such silica foams that contain a secondary solid phase of a fluoride or a mixture of fluorides.

The purified silica foams produced by the use of the present process are valuable in a wide range of end uses. These foams can be made to withstand up to 2,000°F, or even 2,500°F, and they have a very low linear thermal coefficient of expansion. They generally exhibit a uniform pore distribution and a narrow range of pore sizes. They will find wide uses in insulation of pipes, duct work, tanks, storage and freezer spaces, and other industrial processing equipment, railroad, truck and ship spaces, fire-rated and acoustic ceiling board, and roof insulation. As a specific suggestion, they may find use in the production of self-cleaning home ovens. Typical foams prepared by this process were tested and found to have properties shown in the following Table 2.

The resulting foam is, of course, susceptible to further treatment, as desired. For example, the open celled microcellular structure may find useful application as a catalyst support. It may be desirable to treat the foam during leaching or after leaching in order to impart the desired surface characteristics to the resulting rigid silica foam.

Thus, in addition to the separation and recovery of a pure sodium aluminum fluoride (cryolite), aluminum fluoride or any other binary, tertiary or quaternary fluoride, it is also within the scope of the invention to add a mixture of complex salts of copper, chromium, titanium, zirconium, iron, cobalt, barium, vanadium, aluminum, nickel, lithium, osmium, iridium, platinum, ruthenium, rhodium, palladium, rhenium, or any combination thereof to the silica foam matrix during the leaching or washing process, in order to obtain a amorphous rigid silica foam having the desired surface characteristics. When any of the above complex salts are employed, generally their proportion will be within 10 percent of the total dry silica foam. Operating conditions for the production of silica/foam sodium fluoride composite are as set forth in the U.S. Pat. application Ser. No. 198,279—Mallow et al. mentioned earlier. The disclosure of Ser. No. 198,279 is incorporated herein by reference. Silica foam prepared by the above disclosed process has very low thermal conductivity and is a good insulator.

Table 2

| Property | Test | Result |
|---|---|---|
| Density (lb. per cu. ft.) | ASTM C-303/C-302 | 5 |
| Chemical Resistance | | Excellent |
| Acid Resistance | | Excellent |
| Odor | | None |
| Combustibility | ASTM E-136 | None |
| Moisture Absorption, —Vol. % at: | | 0.3% |
| 96 Hrs/100% RH/160°F | | |
| —Immersion | | 15–40% |
| —Autoclave, 5 psi/227°F, 4Hrs. | | 0.3% |
| Thermal conductivity (BTU/ft²/hr°F/in) K at 75°F | ASTM C-177 | 0.28 |
| Thermal Diffusivity (ft²/hr) | | 0.017 to 0.022 |
| Linear Coefficient of thermal expansion (75°F – 2,000°F) in/in°F | | $3.5 \times 10^{-7}$ |
| Maximum Service Temperature | ASTM C-447/C-356 | 2000°F |
| Compressive Strength (PSI 5% Def) | ASTM C-165 | 40 |
| Flexural Strength (PSI Avg. Ult.) | ASTM C-93 | 45 |
| Corrosion | ASTM CS-131-46 | None |
| Acoustic Properties: | ASTM C-384 | |
| Noise reduction coefficient, -normal incidence | | 0.69 |
| -random | | 0.80 |

Following the leaching and washing operation, the silica foam may be dried by the application of conventional radiation, convection, or microwave drying systems.

In order to further describe the invention and without any intention of being limited thereto, the following examples are given:

EXAMPLE 1

An 8 inch × 8 inch × 2 inch rigid foam sample weighing 660 grams was cut from a slab of foam which had been prepared by mechanical frothing methods indicated in FIG. 2. It comprised by weight 56% $H_2O$, 16% NaF and 28% silica, and had a wet density of 18.2 pcf, equivalent to a dry density of 8 pcf. It was spray-leached with a 10 percent solution of $Al_2(SO_4)_3$ using the assembly described in FIG. 1, and the leachates were recycled through the foam five times at ambient temperature. After 5 minutes the foam was washed with water and dried under vacuum at 280° F; and heat-aged for 1 hr at 700° C. The resulting silica foam had the following characteristics:

$SiO_2 = 99.99\%$      fluoride < 5 ppm

-Continued
density = 5.1 pcf
porosity (by gas displacement) = 98%
compressive strength = 52 psi at 5% deformation
thermal conductivity at 75°F = 0.28 BTU in/hr/ft²/°F
flexural strength = 40 psi
thermal stability = 2140°F with less than 0.5% shrinkage The leachate from the foam was concentrated and the solute was precipitated. The precipitate was filtered to obtain 80 grams of commercial purity cryolite.

EXAMPLE 2

The recovery of sodium fluoride as the commercial purity cryolite shown in Example 1 above is dependent on the proportion of the aluminum sulfate salt added to the wet silica-sodium fluoride foam matrix. This is indicated by the various tests utilizing the process described in Example 1, but varying the quantity of aluminum sulfate salt added. Results are summarized in the following Table 3:

Table 3

| $Al_2(SO_4)_3$ percent of stoichiometric requirement | Percent cryolite recovery | Total Fluoride recovery including salts as $Al(OH)F_2$ $Al(OH,F)_3$, $Al(OH)_2F$ and cryolite - Percentage |
|---|---|---|
| 100 | 99 | 100 |
| 150 | 70 | 100 |
| 200 | 50 | 100 |
| 300 | 30 | 100 |
| 400 | 10 | 100 |

When more than stoichiometrically required aluminum sulfate is used, the efficiency of recovery for cryolite decreases. A postulated stoichiometry for cryolite formation is indicated in the following equation:

$$Al_2(SO_4)_3 + 12NaF \rightarrow 2 Na_3AlF_6 + 3 Na_2SO_4$$

The remaining fluorine while extracted effectively from the silica foam, reacts with the excess aluminum sulfate to form an unrecoverable aluminum difluoride complex $AlF_2+$. This complex remains in solution, and can be converted to pure cryolite by the addition of NaCL or NaF. The cryolite obtained according to Example 1 and 2 is dried and calcined at 500° C to obtain a commercially pure product.

EXAMPLE 3

This run was the same as Example 1, except that the leaching and washing of the foam was carried out at 90° C. This resulted in a substantial improvement in the leaching efficiency. The leaching time for the complete abstraction of sodium fluoride was reduced from 5 minutes to 3 minutes and the cryolite produced had a larger particle size.

EXAMPLE 4

A 16 inch × 16 inch × 2 inch rigid foam sample weighing 2,540 grams was cut from a slab of foam which had been prepared as in Example 1. It comprised by weight 57% $H_2O$, 16% NaF, and 27% $SiO_2$, and had a wet density of 21.8 pcf, equivalent to a dry density of 9.3 pcf. The specimen was subjected to a spray-leach of a 10% solution of HCl employing a system described in FIG. 1, and the leachates were recycled four times at 60° C. After 6 minutes the foam was washed with water and dried in a microwave oven. The dry foam was heat-aged at 600° C to remove any of the organics present and was tested for its physical properties. It showed the following characteristics:

$SiO_2$ = 99.98%    fluoride = nil
density = 5.9 pcf
compressive strength = 60 psi at 5% deformation
flexural strength = 37 psi
thermal conductivity at 75°F = 0.278 BTU in/hr/ft²/°F
thermal stability = 2200°F with less than 0.05% shrinkage
acoustic value: Noise reduction coefficient
 -normal incidence coeff/:0.69
 -random incidence coeff/:0.80
porosity = 98.2%

The leachate was concentrated and the fluoride was recovered as calcium fluoride.

EXAMPLE 5

This run was the same as Example 4, except that the fluoride leaching was carried out by immersing the foam in a boiling solution of 8% $(NH_4)_2SO_4$. The ammonium sulfate solution was continuously circulated through the sample for 10 minutes, following which this operation was repeated using water instead of ammonium sulfate. The fluoride-free form when dried in a draft oven at 340° F had these properties:

density = 6.4 pcf
porosity = 97%
compressive strength = 65 psi at 10% deformation
thermal stability > 2000°F The leachates contained the adduct $(NH_4)_2SO_4 \cdot x$ NaF. Cryolite was quantitatively precipitated from this leachate by the addition of aluminum salt.

EXAMPLE 6

This run was essentially the same as Example 5, except that the leaching agent was a 10 percent solution of calcium cloride. The leached foam was 99.9 percent pure amorphous silica and had the following properties:

density = 6.4 pcf    fluoride traces =
thermal conductivity = 0.288 BTU in/hr/ft²/°F at 75°F
thermal stability > 2000°F
compressive strength = 70 psi at 5.5% deformation The leachate contained quantitative amounts of calcium fluoride.

EXAMPLE 7

A further example was run wherein the extract solution consisted of 2 parts of water, 1 part of concentrated hydrochloric acid (37 percent) and 0.1 part of a 42 percent solution of titanium tetrachloride in hydrochloric acid. The extraction was otherwise carried out as in Example 1. The foam was leached for 5 minutes in near-boiling leaching solution and then rinsed with water. The foam was then dried and heat-treated. The presence of the titanium tetrachloride appears to have a beneficial effect on the use of straight hydrochloric acid as a leaching agent. The resulting foam has better compressive strength than foams similarly leached with straight hydrochloric acid. The extract was regenerated with hydrofluosilicic acid ($H_2SiF_6$) in the presence of silica, by addition of and in accordance with the following reaction:

$$[4HCl + 6NaF]_{soluble\ complex} + 6\ H_2SiF_6 + SiO_2$$
$$\rightarrow 2\ Na_2SiF_6 + 4HCl + 2\ H_2O$$

EXAMPLES 8 to 20

These examples show the preparation of specific silica foams using techniques herein disclosed. The thermal conductivity and strength measurements were made on the foams and the results of these tests 98.1 shown in Table 4 below.

Table 4

| Ex. No. | Density pcf | K75°F(BTU in/hr/ft²/°F | Compressive Strength, 10% deformation | Curing | Modes of Leaching |
|---|---|---|---|---|---|
| 8 | 5.10 | 0.281 | 40 psi | Hot-Closed | DIL.HCl (7.1%) |
| 9 | 5.35 | 0.291 | 52 psi | Hot-Closed | DIL.HCl (7.1%) |
| 10 | 5.50 | 0.298 | 47 psi | Hot-Closed | AlCl₃ (7%) |
| 11 | 6.60 | 0.309 | 60 psi | Hot-Closed | DIL.HCl (7.1%) |
| 12 | 6.85 | 0.317 | 76 psi | Hot-Closed | DIL.HCl (7.1%) |
| 13 | 9.0 | 0.300 | 110 psi | Hot-Closed | DIL.HCl (7.1%) |
| 14 | 6.6 | 0.319 | 60 psi | Cold-Closed | CaCl₂Soln. (10%) |
| 15 | 6.7 | 0.326 | 69 psi | Cold-Closed | AlCl₃Soln. (8%) |
| 16 | 7.1 | 0.329 | 64 psi | Cold-Closed | CaCl₂Soln. (10%) |
| 17 | 7.4 | 0.335 | 72 psi | Cold-Closed | AlCl₃ (7%) |
| 18 | 8.0 | 0.332 | 98.5 psi | Cold-Closed | CaCl₂Soln. (10%) |
| 19 | 10.6 | 0.394 | 120 psi | Cold-Closed | CaCl₂Soln. (10%) |
| 20 | 6.4 | 0.288 | 40 psi | Hot-Closed | Al₂(SO₄)₃ Soln. |

The porosity of the foams in Examples 8 to 20 was generally about 98 percent. In some cases it was measured at 98.1 percent.

The reference to "hot closed" and "cold closed" in the column relating to the mode of curing is a reference to the conditions under which the foam was insolubilized (see application, Ser. No. 102,504, Mallow et al., filed Dec. 29, 1970, and its continuation-in-part thereof, referred to above). In the closed curing process, the loss of water during the curing and insolubilizing is reduced or eliminated by maintaining the foam under conditions of high humidity, approaching 100 percent relative humidity.

I claim:

1. In a process for the preparation of inorganic silica foam wherein an aqueous alkali metal silicate chosen from sodium and potassium silicates is foamed and said foam is cured in the presence of an alkali metal or alkaline earth metal silico-fluoride insolubilizer, resulting in a rigid foamed structure having cell walls formed of silica, and containing interstitial alkali metal fluoride reaction product, and treating said cured foam for the removal of alkali metal fluoride, the improvement which comprises preventing degradation and weakening of the strength and insulation properties of the foamed mass by carrying out said leaching step prior to the occurrence of substantial damaging crystal growth of alkali metal fluoride in the wet foamed mass, and by leaching the cured, wet foam with an aqueous solution or colloidal aqueous suspension of an acid or acidic salt leaching agent, said leaching agent being non-reactive with respect to silica, said leaching agent having the ability to form water soluble or water dispersible fluoride compounds or complexes having reduced affinity for the silica structure.

2. A method as in claim 1, wherein the alkali metal silicate is sodium silicate.

3. A method as in claim 1 wherein the leaching agent is an acid or acidic salt derived from the following cations and anions:

cations: ammonium, aluminum, zinc, magnesium, calcium, zirconium, titanium, molybdenum, iron, lithium barium and H⁺;

anions: carbonates, bicarbonates, chlorides, nitrates, nitrites, oxychlorides, borates, metaborates, orthoborates, bisulfates, sulfates, bisulfites, sulfites, phosphates, zincates, stannates, aluminates, chromates, dichromates, titanates, zirconates, manganates, molybdates, acetates, and formates.

4. A method as in claim 3 wherein the leaching agent is chosen from ammonium sulfate, aluminum sulfate, calcium chloride, aluminum chloride, dilute sulfuric acid, and dilute hydrochloric acid, in aqueous solution.

* * * * *

UNITED STATES PATENT AND TRADEMARK OFFICE
CERTIFICATE OF CORRECTION

PATENT NO. : 3,855,393
DATED : December 17, 1974
INVENTOR(S) : Ramesh P. Rao

It is certified that error appears in the above-identified patent and that said Letters Patent are hereby corrected as shown below:

Column 8, line 67, delete "by addition of and".

Column 9, line 1, correct the spelling of "NaF";

line 50, before "treating", insert

-- including the step of --.

Column 10, line 6, after "wet foam mass", delete "and".

Signed and Sealed this twenty-fifth Day of November 1975

[SEAL]

Attest:

RUTH C. MASON
Attesting Officer

C. MARSHALL DANN
Commissioner of Patents and Trademarks